Sept. 1, 1936.  F. I. GETTY  2,053,188
CIRCUIT CLOSER FOR STEERING WHEELS
Filed Sept. 30, 1935  3 Sheets-Sheet 2
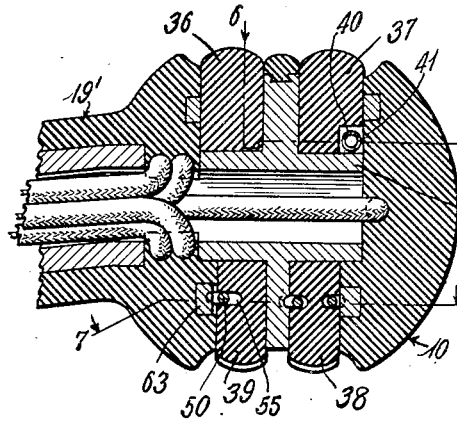
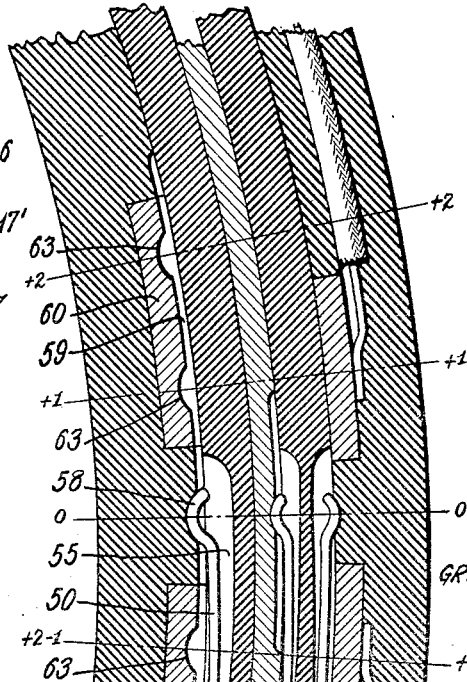
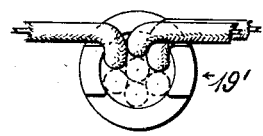
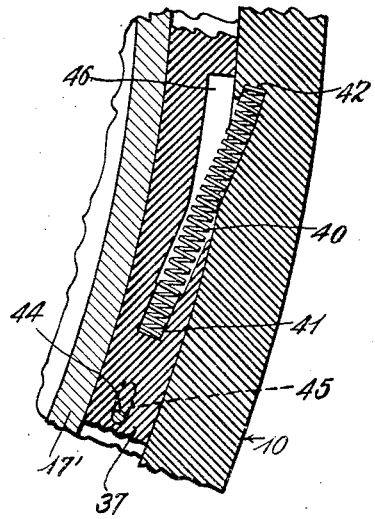
Inventor
Fred I. Getty
By Browne & Phelps
Attorneys

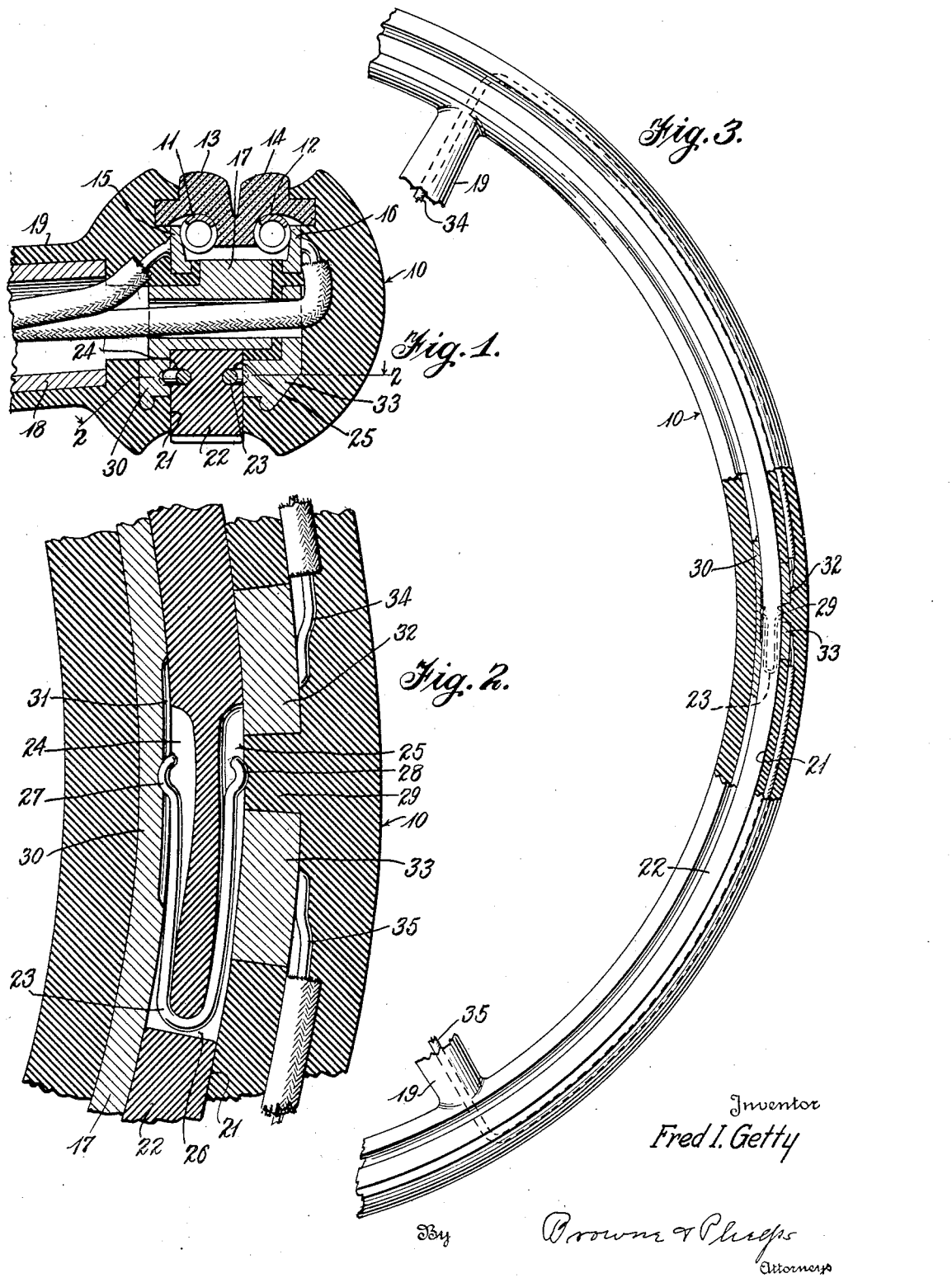

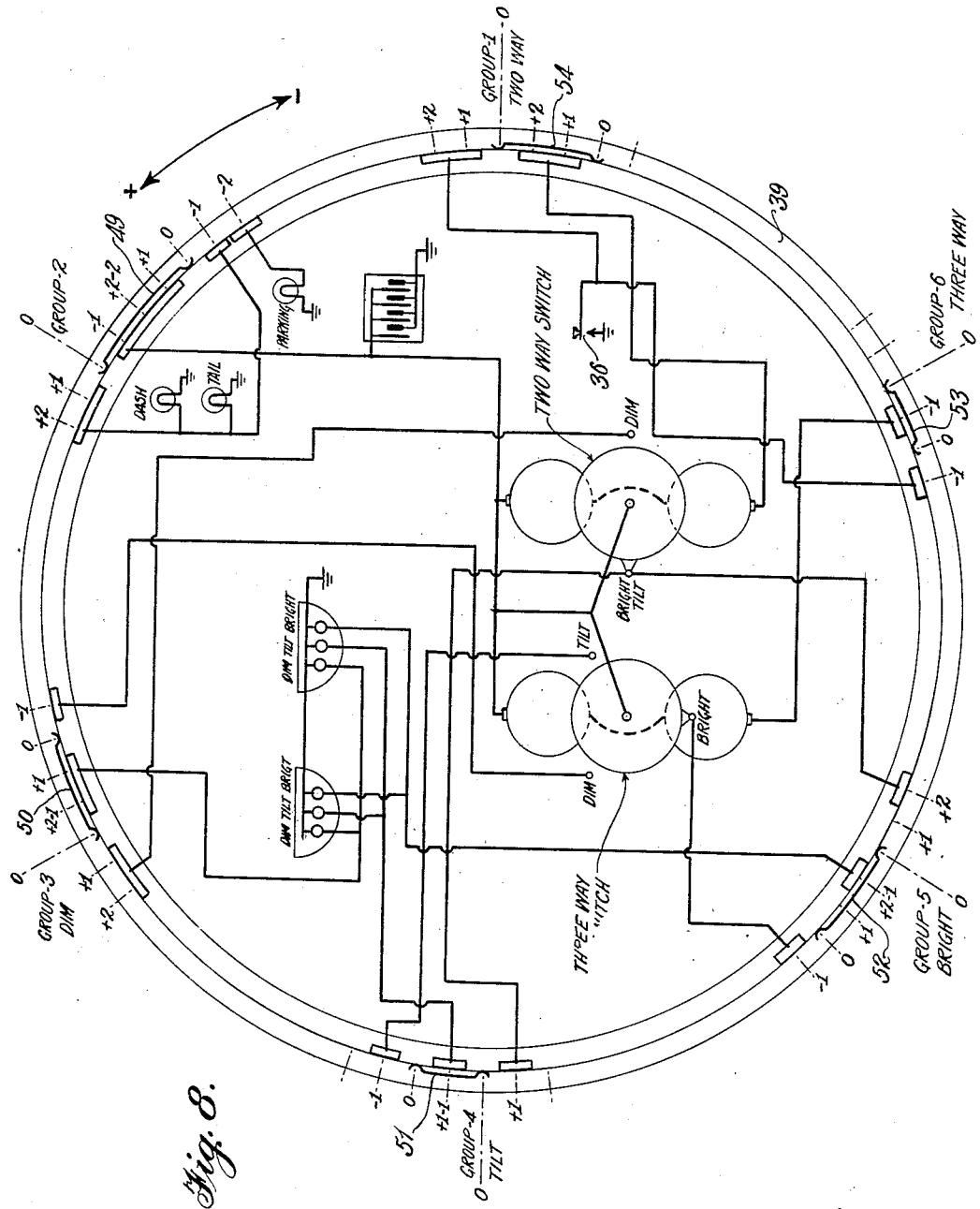

Patented Sept. 1, 1936

2,053,188

UNITED STATES PATENT OFFICE 2,053,188

CIRCUIT CLOSER FOR STEERING WHEELS

Fred I. Getty, Jennings, La.

Application September 30, 1935, Serial No. 42,955

7 Claims. (Cl. 200—59)

The invention relates to circuit closers for steering wheels and has as an object the provision of a form of circuit closer or switch to be applied to steering wheels to control electric accessories of an automobile from the rim of the steering wheel of the vehicle.

It is a further object of the invention to provide a circuit closer for a steering wheel operating by sliding movement circumferentially of the wheel.

It is a further object of the invention to provide various forms of slidable members or slidable rings carried in a groove or grooves in the rim of the steering wheel, operating upon circumferential sliding movement to control the circuit or circuits provided to include accessories of the vehicle as lights, horn, and/or direction signals.

Further objects of the invention will appear from the following description when read in connection with the accompanying drawings showing illustrative embodiments of the invention, and wherein:—

Figure 1 is a detail vertical cross section through a steering wheel rim showing the invention in one form;

Fig. 2 is a detail horizontal section on line 2—2 of Fig. 1;

Fig. 3 is a detail plan view of a section of steering wheel rim showing wiring connections;

Fig. 4 is a view similar to Fig. 1 of another form of the invention;

Fig. 5 is an end view of a metallic core only of a spoke showing wires projecting therefrom;

Fig. 6 is a detail horizontal section on line 6—6 of Fig. 4;

Fig. 7 is a detail horizontal section on line 7—7 of Fig. 4 showing a preferred construction of certain of the contact elements provided in the rim; and Fig. 8 is a diagrammatic view of a system of circuits for convenience shown within a diagrammatic showing of a portion of a steering wheel rim.

As shown in Figure 1 a steering wheel rim is indicated at 10 and in the upper part of the rim is shown a pair of circuit closers 11, 12, which may be caused to bridge a circuit by pressure upon the appropriate bead 13 or 14 to cause a band of helically formed wire to bridge between contacts 15 or 16 and a core portion 17 of the wheel rim, which core portion is indicated as grounded upon the metallic portion 18 of the spoke 19.

It is to be understood that the beads 13, 14 are carried by a resilient closer 20 for the recess in which the members 15, 16 and 17 are exposed, the resilient closure 20 being preferably formed of partially vulcanized resilient rubber, and that upon release of pressure upon the bead 13 or 14, the circuit will return to open circuit condition.

In accordance with the invention as illustrated in Fig. 1, a circuit closer for direction signals is embodied in the rim housed in a groove 21 in the lower side of the rim. For this purpose a ring 22 of insulating material as hard rubber, bakelite or the like is shown as circumferentially slidable in the groove 21 and carries with it a bridging member 23 illustrated in detail in Fig. 2. For purposes of illustration this bridge member is shown in Fig. 1 as opposite the spoke 19 but preferably its position will be that shown in Fig. 3 midway between a pair of spokes.

As shown the bridging member 23 is of U shape and is carried in a pair of grooves 24, 25 in the ring 22, the U portion extending through a perforation 26 in the ring.

The member 22 is shown as formed with U shaped ends 27, 28, the end 28 normally standing upon a block of insulation 29 which may be integral with the rim.

The portion of the core 17 shown at 30 is illustrated as formed with a groove 31 in which the member 27 slides and in normal position the members 27 and 28 engage depressions in the member 30 and in the member 29 to indicate and preserve a normal position of the ring. It will be seen that by sliding the ring beyond its normal travel so that the member 27 rides out of the groove 31, the ring may be freely removed from the rim of the wheel.

When the member 23 is moved so that the member 28 contacts with the contact member 32 or 33, a circuit may be closed through the direction signals of the vehicle by means of wires 34 or 35, which wires are indicated in Fig. 3 as leading through hollow spokes of the wheel.

In the form of Fig. 4, the circuit closers 11 and 12 are replaced by the sliding ring type of circuit closer of the invention indicated at 36 and 37 and the ring 22 is replaced by a third sliding ring 38. To control electromagnetic switches for the purpose of manipulating the lights of the vehicle, a fourth ring 39 is indicated in Fig. 4.

It is preferred to utilize one of the sliding rings as 37 to control the horn, and the other thereof as 36 to operate a connected electromagnetic switch for control of lights. Either ring may be moved a short distance in one direction to close a circuit against the yielding pressure of a spring, as spring 40, which spring serves to return the ring to normal open circuit position when the ring is released. The sliding rings should be knurled, corrugated or otherwise roughened to provide a grip of a finger thereon.

The spring 40 is shown as seating in a socket 41 in the ring 37 at one end and in a socket 42 in the rim at its remaining end. A screw 44 passing through the ring 37 from its exposed surface, has its lower end projecting beyond the lower surface of the ring into a slot 45 to act as a stop to limit the movements of the ring.

The rings may each be provided with a plurality of springs as 23 which may be connected in parallel if a single circuit is to be controlled. Or one of such springs may be a circuit closing spring and others may be exactly similar except that they coact with no contacts. Such a plurality of springs coacting with the grooves 31 in the core 17 or 17' will retain the rings in their grooves.

A spring and slot as 44, 45 may be provided for each sliding ring, the slot 45 being adapted to the intended movements of the ring. To remove a ring, it is only necessary to back off the screw 44 and then move the ring in the proper direction beyond its normal movements until the springs 23 (or 50) ride out of the grooves 31 (or 59), when the ring may be freely removed from its groove.

Where a ring is provided with a spring 40, movement of the ring (as downwardly in Fig. 6) to disassemble the ring from the groove, will first withdraw the spring from the socket 42 and then press the spring into recess 46, whereupon the spring will not interlap the ring and wheel rim to prevent removal of the ring.

The reverse of this action in assembly, will include insertion of the spring in the socket 41, pressing the same into the recess 46, insertion of ring into the groove and movement toward operating position. In the last named movement the angle of socket 41 will cause the spring to enter socket 42. To assist this tendency the spring 40 may be formed normally bowed or curved to increase its tendency to snap into socket 42. The spring must have a tight fit in socket 41 and a loose fit in socket 42.

In Fig. 8 is shown a diagrammatic view of a system of circuits to provide a light control corresponding to that described and claimed in my copending application Ser. No. 17,091, filed April 18, 1935.

In accordance with the circuit arrangement illustrated in Fig. 8, six groups of contacts are provided to be controlled by one of the rings as 39. The ring is slidable from a zero position in either the plus or minus direction indicated by the arrow in Fig. 8. Groups 1 and 6 are devoted to the control of a connection of electromagnetic switches with a circuit closer which in the present invention may be either the circuit closer 11 of Fig. 1 or 36 of Fig. 4. Group 2 of the contacts is devoted to the control of the parking, dash and tail lights; group 3 to the control of the dim lights; group 4 to the control of the tilt lights; and group 5 to the control of the bright lights.

The ends of the bridge members 49—54 have their zero positions indicated in Fig. 8 and the positions of the ends of these bridging members are indicated for each position of plus or minus direction of movement of the ring 39.

It will be unnecessary to trace the circuits of the system illustrated in Fig. 8 as the system is that of my co-pending application above referred to, it being sufficient to state that in plus 1 position, a two-way switch is connected with the circuit closer, the dash and tail lights are in circuit and the dim and tilt lights are connected with the two-way switch. In position plus 2 the same circuit closer is connected, the dash and tail lights are illuminated and the dim and bright lights are connected with the two-way switch. In position minus 1, the dash and tail lights are illuminated, the three-way switch is connected with circuit closer 36 and the dim, tilt and bright lights are connected with the corresponding contact members of the three-way switch, while in position minus 2 the only contact closed is that of the parking light to battery.

In Fig. 7 is shown a structure of the group 3 of the contacts of Fig. 8 and also of the ring 38 for control of the direction signals. As there shown the bridging member 50 resides in a groove 55 in ring 39 and has a projection 56 engaging a depression in ring 39 to cause the member 50 to travel with the ring. The ends 57, 58, of member 50 travel in a groove 59 which is continuous across the contact blocks 60, 61, 62, each of which contact blocks has a depression or depressions 63 for positioning of the ring 39 in its movement.

The zero position of the member 50 may also be determined by depressions 64 in the rim 10, as indicated.

The system of Fig. 8 will require fifteen wires to run to the rim, which with a horn wire and two direction wires will make a total of eighteen wires to be run to the rim.

In Fig. 5 is shown an arrangement of six wires extending through a hollow spoke, which when there are three spokes to the wheel as is usual, will supply the connections for the full control of the accessories provided by the system of Fig. 8 when used with either of the circuit closers in the upper portion of the wheel shown in Fig. 1 or Fig. 4.

Minor changes may be made in the physical embodiments of the invention within the scope of the appended claims without departing from the spirit thereof.

I claim:

1. A steering wheel carried circuit closer comprising, in combination: a wheel rim having a groove; a movable member in said groove slidable circumferentially of said wheel; contact elements fixed in said rim and exposed in said groove; a wall of said groove and the opposed surface of said movable member formed with opposed longitudinal registering grooves; the groove in said wall extending across at least one of said contact members; and a bridging member mounted to travel with said movable member and residing in said opposed grooves to bridge said contact members and to retain said movable member in said first named groove.

2. A steering wheel carried circuit closer comprising, in combination: a wheel rim having a groove; a movable member in said groove slidable circumferentially of said wheel; contact elements fixed in said rim and exposed in said groove; a wall of said groove and the opposed surface of said movable member formed with opposed longitudinal registering grooves; the groove in said wall extending across at least one of said contact members; a bridging member mounted to travel with said movable member and residing in said opposed grooves to bridge said contact members and to retain said movable member in said first named groove; and means whereby movement of said movable member out of normal operating position causes said bridging member to ride out of one of said opposed grooves to permit removal of said movable member.

3. A steering wheel carried circuit closer comprising, in combination: a wheel rim formed with an annular groove; a ring of insulating material circumferentially slidable in said groove; a metallic core in and forming a part of said rim to be grounded upon the frame of a vehicle; a portion of said core exposed in a wall of said groove; a fixed contact member carried by said rim and exposed in a second wall of said groove; a bridging member mounted to travel with said ring having portions to be brought into and out of bridging relation with said exposed core portion and said contact member by circumferential movement of said ring.

4. A steering wheel carried circuit closer comprising, in combination: a wheel rim formed with an annular groove; a ring carried in said groove for circumferential sliding movement; a plurality of groups of contacts fixed in said rim and exposed in said groove; a bridging member carried by said ring for each group of contacts, to simultaneously interconnect, selected contacts of a plurality of said groups upon selective movement of said ring; and circuit means to control automobile lights by interconnection of various of said contacts.

5. A steering wheel carried circuit closer comprising, in combination: a wheel rim formed with an annular groove; a ring carried in said groove for circumferential sliding movement; a plurality of groups of contacts fixed in said rim and exposed in said groove; a bridging member carried by said ring for each group of contacts, to simultaneously interconnect selected contacts of a plurality of said groups upon selective movement of said ring; circuit means to control automobile lights by interconnection of various of said contacts; and a separate circuit closer carried by the wheel rim to close circuits under control of certain of said contacts.

6. A steering wheel carried circuit closer comprising, in combination: a wheel rim having an annular groove and a recess in a wall of said groove: a ring slidable in said groove, and formed with a recess; a spring acting in compression between oppositely facing walls of said recesses to urge said ring toward normal position; and contacts carried by said rim and ring respectively, to be brought into electrical connection by movement of said ring against the urge of said spring.

7. A steering wheel carried circuit closer comprising, in combination: a wheel rim having an annular groove and a recess in a wall of said groove; a ring slidable in said groove and having a recess partially in registry with said first named recess, in the normal position of the ring; a spring fixed to said ring and acting in compression between oppositely facing walls of said recesses to urge the ring toward normal position; said spring movable out of the rim recess and into the ring recess upon an abnormal movement of the ring, to permit removal of the ring from the groove; and contacts carried by said rim and ring respectively, to be brought into electrical connection by movement of said ring against the urge of said spring.

FRED I. GETTY.